United States Patent [19]
Oglesbee et al.

[11] Patent Number: 6,100,664
[45] Date of Patent: Aug. 8, 2000

[54] SUB-MINIATURE HIGH EFFICIENCY BATTERY CHARGER EXPLOITING LEAKAGE INDUCTANCE OF WALL TRANSFORMER POWER SUPPLY, AND METHOD THEREFOR

[75] Inventors: John Wendell Oglesbee, Watkinsville; Michael D. Geren, Suwanee, both of Ga.

[73] Assignee: Motorola Inc., Schaumburg, Ill.

[21] Appl. No.: 09/282,726

[22] Filed: Mar. 31, 1999

[51] Int. Cl.[7] .................................................. H02J 7/00
[52] U.S. Cl. ............................................ 320/125; 320/129
[58] Field of Search ................................ 320/125, 139, 320/140, 129; 323/222

[56] References Cited

U.S. PATENT DOCUMENTS

| | | | |
|---|---|---|---|
| 4,061,956 | 12/1977 | Brown et al. | 320/153 |
| 4,962,354 | 10/1990 | Visser et al. | 323/222 |
| 5,783,933 | 7/1998 | Bailly | 323/222 |

*Primary Examiner*—Shawn Riley
*Assistant Examiner*—Lawrence Luk
*Attorney, Agent, or Firm*—Felipe Farley; Philip H. Burrus, IV

[57] ABSTRACT

A battery charger (100) suitable for sub-miniaturization and connection to a wall transformer power supply (20) to charge a battery (30). The battery charger (100) features a switch (130) that controls flow of current from the transformer (20) either to output terminals for charging the battery (30) or to ground, a voltage regulator (120), a microprocessor (110), a current sensing resistor (150) and a Schottky diode (140). The microprocessor (110) is coupled to the switch (130) to control whether the switch is open or closed. The secondary leakage inductance of the wall transformer (20) is exploited to control charging of the battery. The microprocessor (110) is programmed to initiate a charging mode comprising oscillation between a conduction interval and a flyback interval. A charging pulse is delivered to the battery (30) during the flyback interval.

19 Claims, 5 Drawing Sheets

SUB-MINIATURE HIGH EFFICIENCY BATTERY CHARGER EXPLOITING LEAKAGE INDUCTANCE OF WALL TRANSFORMER POWER SUPPLY, AND METHOD THEREFOR

RELATED APPLICATION

This application is related to commonly assigned U.S. application Ser. No. 09/282,705, filed on Mar. 31, 1999, and entitled "SUB-MINIATURE HIGH EFFICIENCY BATTERY CHARGER SYSTEM AND METHOD," the entirety of which is incorporated herein by reference.

FIELD OF THE INVENTION

The present invention is directed to battery chargers, and more specifically to a battery charger that achieves high efficiency switch mode control of battery charging current using a simplified circuit topology that is inexpensive and easily packaged in a sub-miniature package.

BACKGROUND OF THE INVENTION

Battery chargers are used to charge batteries of electronic appliances, such as portable computers, cellular telephones, pagers, etc. When used in connection with very small portable electronic devices, such as cellular telephones and pagers, it is preferable that the battery charger device be as small and portable as possible.

Battery chargers are known that use an ON-OFF control whereby the power source is alternatively connected and disconnected in order to generate an average charging current for the battery. This type of battery charging system is generally restricted to a single average value of charging current determined by the external power supply.

A need exists in the marketplace for a battery charging system which is low cost and retains the multi-chemistry performance advantages of a conventional switch mode power conversion system, but can be implemented in a miniature form without the use of bulky energy storage components. In addition, it is desirable to provide a switch mode power conversion type battery charger that can operate at very low switching frequencies and switching speeds, and thereby minimize electromagnetic interference (EMI) in sensitive receiver circuitry of the host device.

DETAILED DESCRIPTION OF A PREFERRED EMBODIMENT

Figure 1:
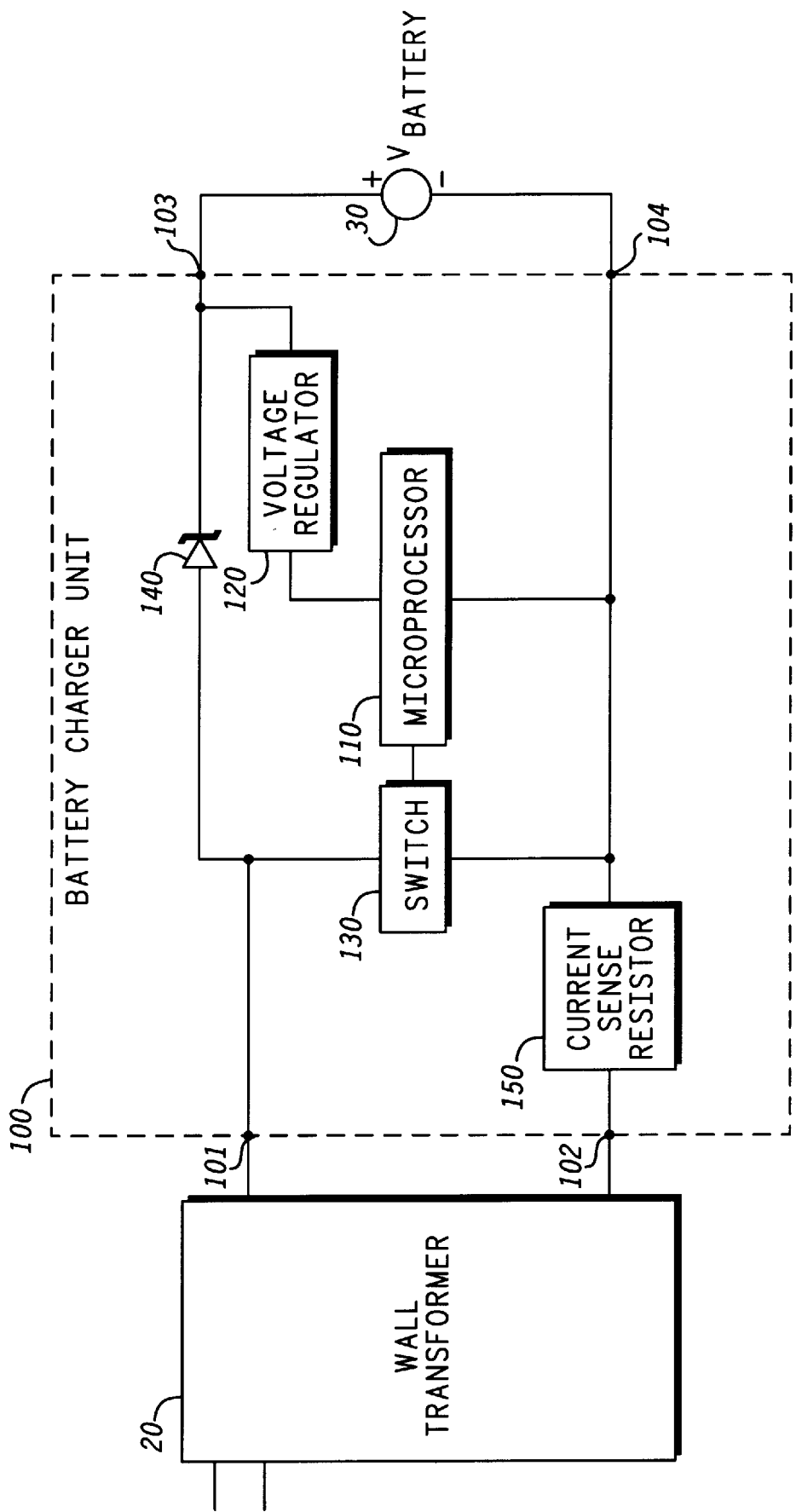
FIG. 1 is a block diagram of the battery charger according to the present invention connected to a wall transformer.

Referring first to FIG. 1, a battery charger according to the present invention is shown at reference numeral 100. The battery charger 100 has input terminals 101 and 102 that connect to the output of a standard wall transformer power supply 20, and output terminals 103 and 104 that connect to a battery 30 to be charged. There are five basic components of the battery charger 100: a single microprocessor controller 110, a voltage regulator 120 for powering the microprocessor 110, a switch 130, a Schottky diode 140 and a current sensing resistor 150. The diode 140 may be any diode similar to a Schottky diode that has a low forward voltage.

The battery charger 100 functions with a standard low cost unregulated linear (line frequency) wall transformer 20 having a rectified power supply. Of importance is that the battery charger 100 does not require any bulky filter capacitor or active (with a bulky inductor) output regulator. Rather, the battery charger 100 exploits the inherent secondary leakage inductance of the wall transformer 20 as an inductive energy storage element for accomplishing switch mode power conversion. In addition, the inherent energy storage capability and "capacitor-like" characteristics of the battery 30 are exploited to stabilize the charging voltage for switch mode power conversion.

The wall transformer power supply 20 used with the battery charger 100 of the present invention is lower in output voltage and higher in output current than conventionally used with prior art step down (buck) type battery chargers. The transformer voltage is boosted by the power conversion system of the battery charger 100 to achieve the correct charging voltage. Nevertheless, the overall transformer size and cost is comparable to that used with a conventional step down charger.

Figure 2:
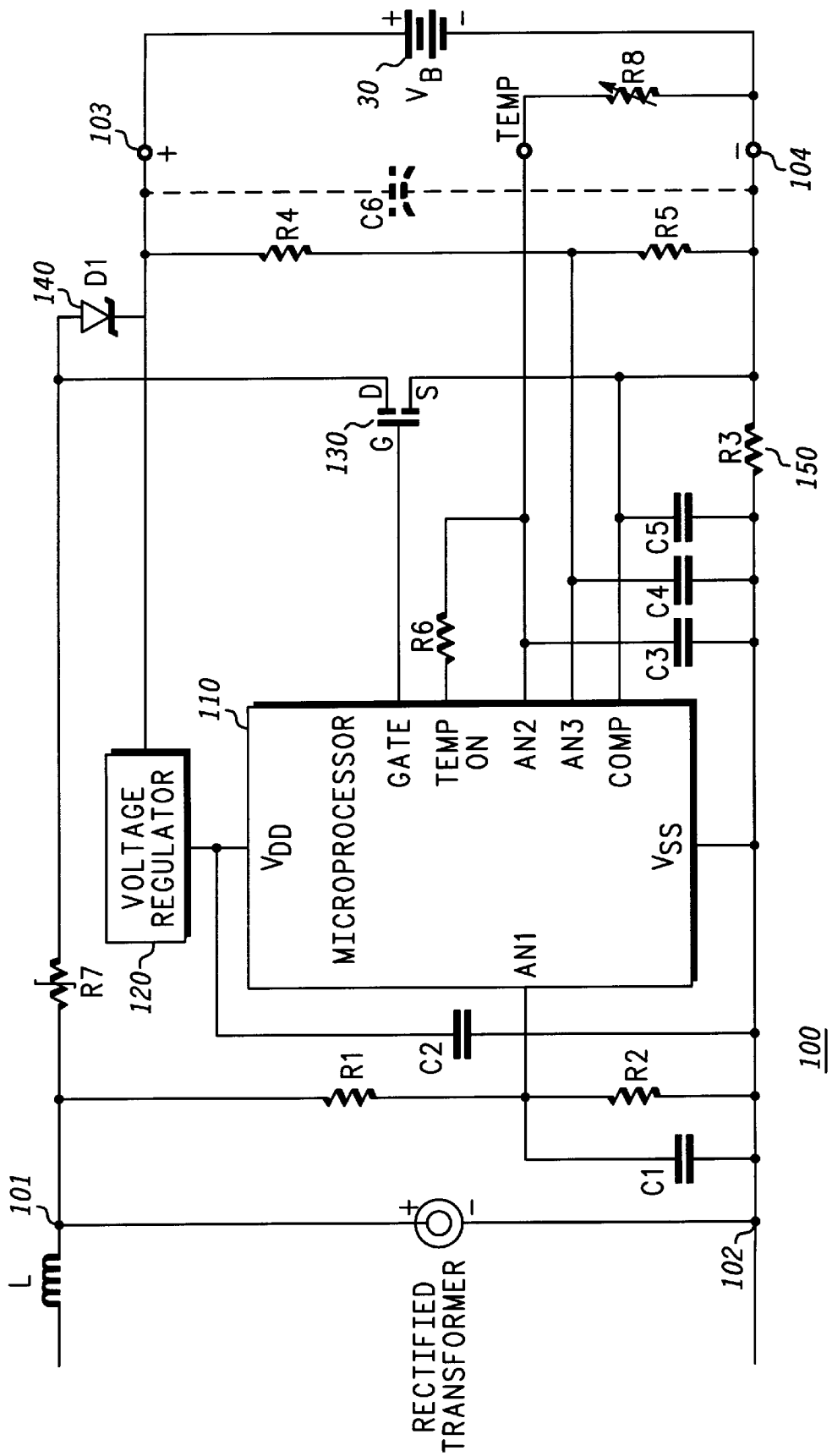
FIG. 2 is an electrical schematic diagram of the battery charger according to the present invention.

Turning to FIG. 2, the battery charger 100 will be described in greater detail. The input terminals 101 and 102 are connected to the rectified output of the transformer 20. As explained above, the secondary of the transformer 20 has some inherent leakage inductance represented by the inductor L shown connected to the input terminal 101. A voltage divider consisting of resistors R1 and R2 is connected across the input terminals 101 and 102. Capacitor C1 connected in parallel with resistor R2 is provided for electromagnetic interference (EMI) and static discharge immunity as is well known in the art. A non-linear resistor R7 is connected between the input terminal 101 and the Schottky diode 140.

The microprocessor 110 functions as a controller for the battery charger 100. A software program that is executed by the microprocessor 110 to control the battery charge is stored in on-board memory or alternatively a separate memory.

The voltage regulator 120 is connected to the other terminal of the Schottky diode 140 and to a $V_{DD}$ pin of the microprocessor 110. Input pin AN1 of the microprocessor 110 is connected the node between resistors R1 and R2 to sense a bias voltage for determining when there is input power available at the input terminals 101 and 102, as will be described hereinafter.

The switch 130 is a low cost N-channel field effect transistor (FET) having a gate terminal (G), source terminal (S) and drain terminal (D). The gate terminal of the switch 130 is connected to a GATE pin of the microprocessor 110. The drain of the switch 130 is connected to a point between the non-linear resistor R7 and the Schottky diode 140, and the source of the switch 130 is connected to one end of the current sense resistor 150 (corresponding to resistor R3). When the switch 130 is ON (closed), a current path is created from the input terminal 101 through resistor R7, through the switch 130 to the input terminal 102. When the switch 130 is OFF, the switch 130 is open and no current flows through the path of the switch 130.

Having described the primary components of the battery charger 100, its operation will now be described with reference to FIG. 2, in conjunction with FIGS. 3 and 4. The other components not yet referred to will be described in the course of the operational explanation hereinafter.

The battery charger 100 has three modes of operation: Standby, Backup and Charging. A software program is stored in an on-board memory (not shown) in the microprocessor 110 that is executed by the microprocessor 110 to control the operation of the battery charger 100. The software program is referred to hereinafter as the power switch mode control software program.

Figure 3:
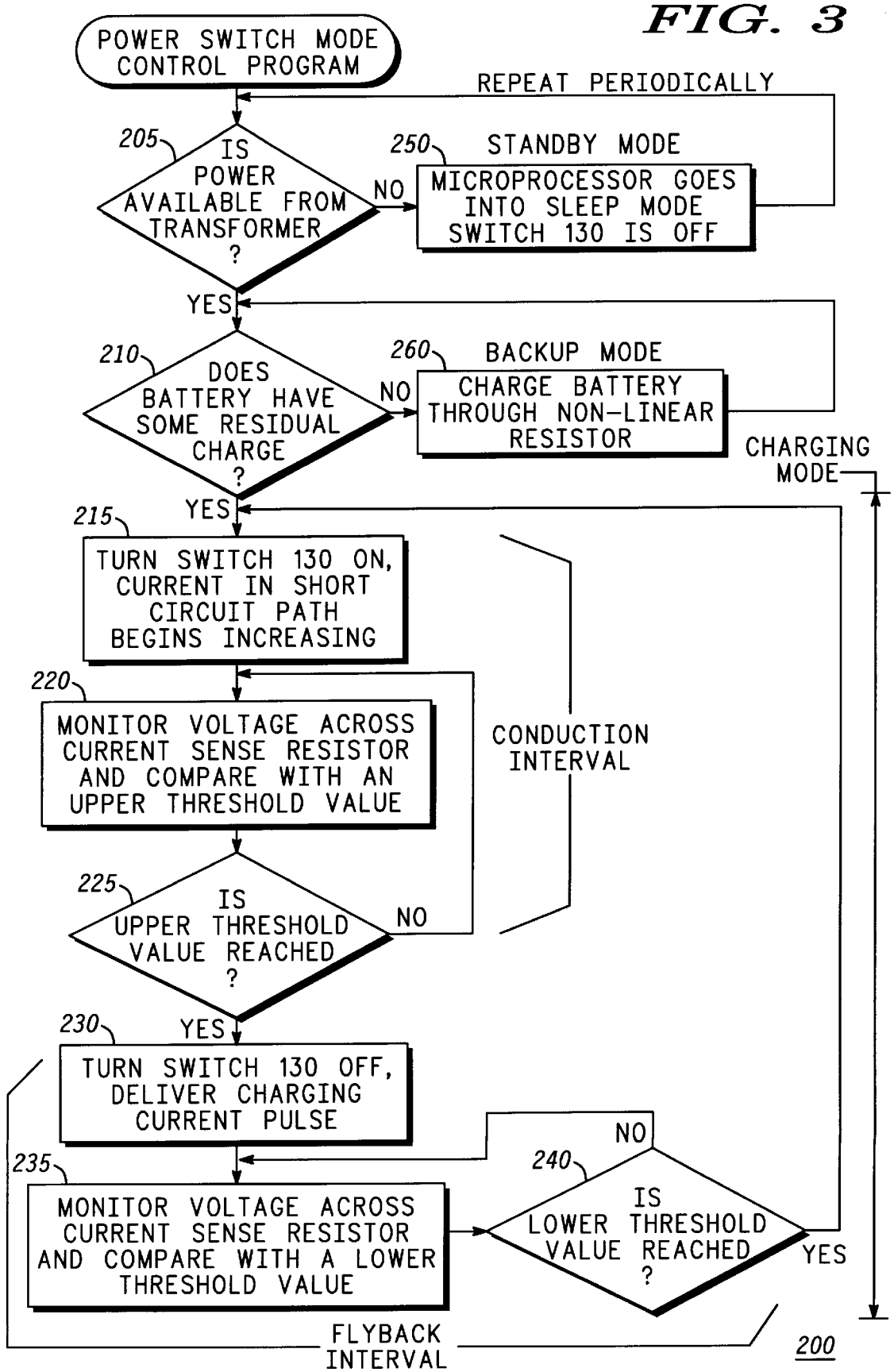
FIG. 3 is a flow chart showing the operation of the battery charger of the present invention.

FIG. 3 is a flow chart that depicts the logical flow of the power switch mode control software program 200 executed by the microprocessor 110 in the course of controlling the battery charger 100. In step 205, the microprocessor 110 determines whether power is available from the transformer 20. When the battery charger 100 is connected to the transformer 20 and the transformer 20 is plugged into a wall outlet, there will be power available from the transformer 20. The microprocessor 110 makes this determination by measuring voltage at pin AN1 which corresponds to the voltage across resistor R1 and capacitor C1. If there is a significant voltage at pin AN1 then the power is available from the transformer and the process continues. If it is determined that no power is available from the transformer (either the battery charger is not connected to it or the transformer is not plugged into a power supply), then the process enters the StandBy Mode to be described hereinafter.

Next, in step 210, it is determined whether the battery 30 has some residual charge (a predetermined value of 2.0 volts or greater) on it or whether it is completely discharged. The microprocessor 110 makes this determination by measuring the voltage across resistor R5. If there is at least a residual charge on the battery 30, then the process proceeds to the charging mode described below.

CHARGING MODE

It is assumed in the Charging Mode, that even though the battery 30 may be partially or fully discharged, there is still sufficient residual charge in it to operate the voltage regulator 120 that powers the microprocessor 110. In the Charging Mode, the resistance of the non-linear resistor R7 is essentially zero and therefore it is ignored for description of this mode.

As shown in FIG. 2, when the residual battery voltage is greater than the rectified output voltage of the transformer 20, no current can flow through the Schottky diode 140 because the diode 140 will not be sufficiently biased. Indeed, the transformer 20 is intentionally designed to satisfy this criterion. Therefore, initially there is no current flow from the transformer 20 to the battery 30. However, there is sufficient voltage from the transformer 20 to develop a bias voltage across resistor R2 of the voltage divider R1 and R2. The microprocessor 110 detects the bias voltage level at pin AN1, and from this signal knows that there is power available. In response, the microprocessor 110 "wakes-up" and enters a charging mode of operation.

In the charging mode of operation, the microprocessor 110 begins a power switch mode charging cycle by turning ON the switch 130 in step 215. Switch 130, when turned ON, shorts the output of the transformer 20 and therefore current begins flowing in a current path from the input terminal 101, through resistor R7, through the drain and source of switch 130, through current sense resistor 150 to the output terminal 102. During this time, the residual voltage of the battery 30 powers the microprocessor 110 via the voltage regulator 120.

The rate at which the short circuit current through the switch 130 increases is determined by the secondary leakage inductance L of the transformer 20. This inductance is fairly large for this type of transformer, and therefore the current in the short-circuit path builds up at a relatively slow rate compared to typical switch mode converters. The rise of current with time is approximately linear. The time interval when the switch 130 is ON is termed the "conduction interval" as indicated in FIG. 3.

During the conduction interval, in step 220 the microprocessor 110 continuously monitors the voltage across the current sense resistor 150. This signal is coupled to a programmable voltage comparator inside the microprocessor 110. The microprocessor 110 sets thresholds to which the voltage across the current sense resistor 150 is compared. These thresholds are variable and are established by the power switch mode control software program stored in the microprocessor 110. During the conduction interval, the microprocessor 110 compares the voltage across the current sense resistor with a first or upper threshold. The first or upper threshold is, for example, approximately four times the desired average charging current for the battery 30. In step 225, the microprocessor 110 determines when the upper threshold is reached. If the upper threshold is not reached, then the process repeats from step 220 and the microprocessor 10 continues to monitor the voltage across the current sense resistor 150.

When the upper threshold is reached the conduction interval ends and the process continues to step 230. In step 230, the microprocessor 110 immediately turns off the switch 130. Since current flowing in the leakage inductance L of the transformer 20 cannot change instantaneously when switch 130 is switched OFF, the current from the transformer follows a new path through the Schottky diode 140 and into the battery 30.

After the switch 130 is turned OFF, the inductive energy stored by the leakage inductance L of the transformer 20 momentarily supports current flow through the Schottky diode 140 and the battery 30. The effective capacitance of the battery causes the battery voltage to remain essentially constant during this pulse of current, called a charging current pulse. Since the leakage inductance L of the transformer 20 is delivering energy, the current begins to decrease in the charging path as the leakage energy dissipates. The rate of decrease of charging current is determined by value of the secondary leakage inductance L of the transformer 20, and is relatively linear and at a slow rate compared to more conventional switch mode converters. The interval of current flow supported by the transformer leakage energy when the switch 130 is turned OFF is called a "flyback interval" as indicated in FIG. 3.

During the flyback interval, the power switch mode control algorithm in the microprocessor 110 changes the programmable comparator threshold to a different value corresponding to a second or lower threshold. For example, the lower threshold is approximately three times (as opposed to four times) the desired average charging current. In step 235, the microprocessor 110 monitors the voltage across the current sense resistor and compares it with the lower threshold value. When the lower threshold is reached, a new conduction interval for the switch 130 is initiated by the microprocessor 110, and the process repeats from step 215 as explained above. Otherwise, the current is allowed to decrease until the microprocessor 110 eventually determines that it has reached the lower threshold value.

Figure 4:
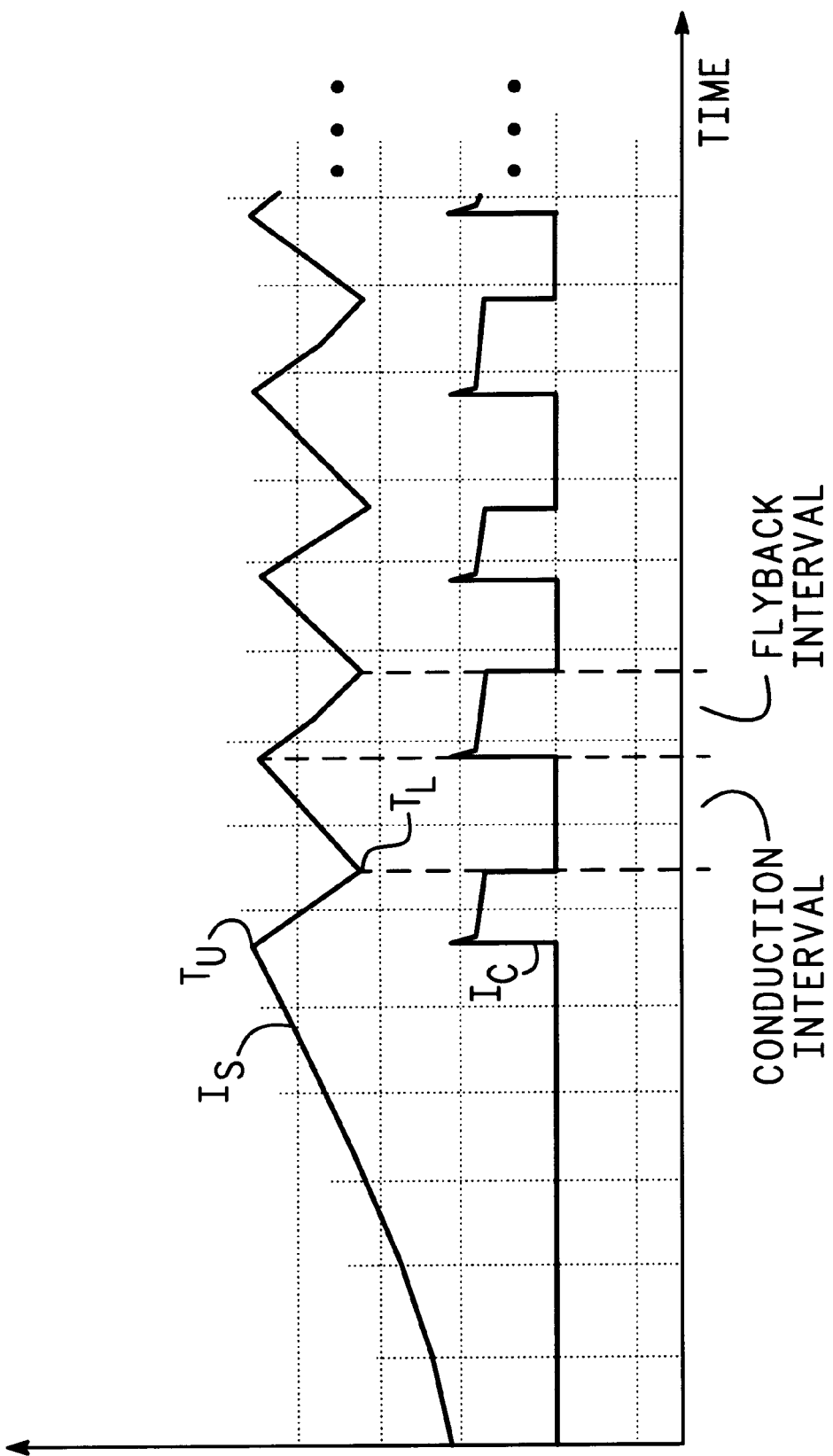
FIG. 4 is a graphical diagram showing the waveforms of the transformer output current and the battery charging current.

To summarize and with reference to FIG. 4, the secondary current ($I_S$) in the transformer 20 is forced by the microprocessor 110 to oscillate between two values established by upper and lower thresholds ($T_u$ and $T_L$). During the conduction interval of oscillation, current increases and builds up energy in the leakage inductance of the transformer 20. During the flyback interval of oscillation, current decreases and the leakage inductance energy of the transformer charges the battery 30 with a defined average charge current. The upper and lower thresholds of instantaneous current for each charging current pulse are defined by the power switch mode control algorithm executed by the microprocessor 110. The rate of decrease of current between these thresholds is approximately linear, and the charge current pulse is approximately trapezoidal in shape as shown in FIG. 4.

Figure 5:
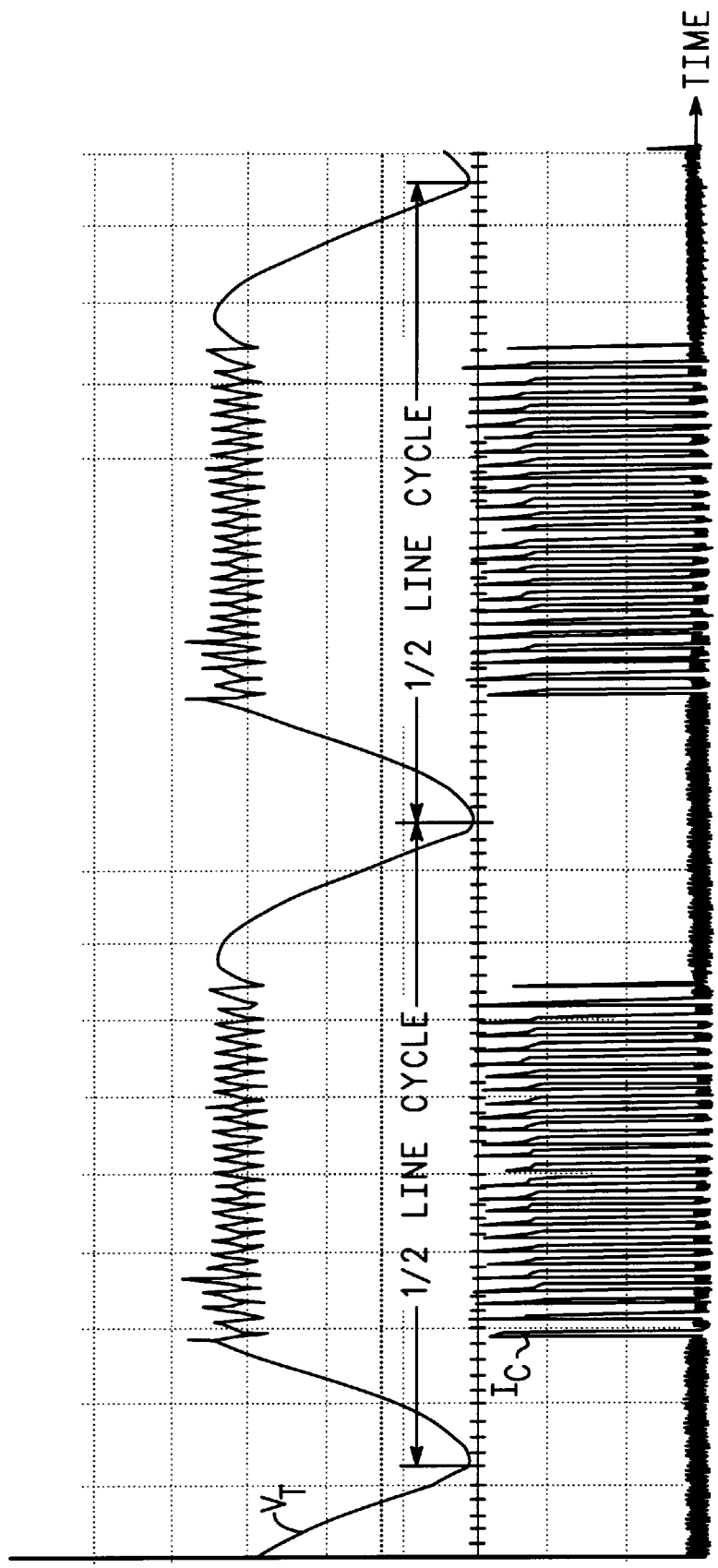
FIG. 5 is a graphical diagram showing the transformer output current and the battery charging current pulses over a longer period of time than shown in FIG. 4.

With reference to FIG. 5, there are periods of time when the rectified transformer voltage ($V_T$) approaches zero and consequently no appreciable current will flow even during the conduction interval of the switch 130. This is because the fully rectified sine-wave voltage waveform of the transformer 20 approaches zero twice per cycle. During these time intervals, the switch 130 remains closed, however no charging current pulses are transferred to the battery 30 because the upper programmable comparator threshold is never reached. As a result of this zero-crossing phenomenon, oscillation of the charging current is only sustained approximately two-fourths of the total sine-wave cycle of the transformer voltage. Current pulses are delivered to the battery 30 in "pulse bursts" only during the period of time when oscillation is sustained in the power circuit.

In addition to controlling the peak current, the microprocessor 110 continuously and periodically calculates the actual average charging current. This is readily accomplished because the current changes relatively slowly and in a nearly linear manner between the upper and lower thresholds. By approximating that the current decreases in a nearly linear manner during the flyback interval, the microprocessor 110 can accurately calculate the actual average charging current for any arbitrary time period. Alternatively, a "running average" can be calculated for the actual average current in which the most recent average calculation for a given period of time is given a weighted value that is combined the average for all previous calculations.

A further feature of the present invention is that the actual average current (calculated periodically or as a running average) is used as a feedback parameter in a closed loop control system to regulate the value of the average charging current. After calculating the average current, it is used as an input to a closed loop software current regulator control algorithm executed by the microprocessor 110. The microprocessor continuously adjusts the programmable upper and lower thresholds so as to keep the actual average current at precisely the desired value.

STANDBY MODE

With reference to FIG. 3, the Standby Mode of operation of the battery charger 100 occurs when the battery 30 is connected to the charger 100, but no input power is available. This condition is determined in step 205 when the microprocessor 110 determines that no power is available from the transformer 20. To prevent power from being consumed by the microprocessor 110 and gradually discharging the battery 30, in step 250 the microprocessor 110 goes into a standby sleep mode. In this mode, the clock of the microprocessor 110 runs at a reduced frequency and the microprocessor operations are minimized to reduced current drain. The switch 130 remains OFF in this mode, and the logic voltage at resistor R6 is turned off to avoid any current drain of the battery 30 through this resistor. The microprocessor determines when the standby sleep mode should be activated or deactivated by monitoring the input voltage from the divider R1 and R2.

BACKUP MODE

As explained above, during the Charging Mode, it was assumed that the battery 30 had sufficient residual charge to operate the voltage regulator 120 that powers the microprocessor 110. In rare circumstances, the battery 30 may be radically discharged such that the residual charge is not sufficient to operate the microprocessor 110. This condition is detected in step 210. The battery charger 100 has a BackUp Mode of operation in step 260 that charges the battery 30 until sufficient "residual" charge is available to run the voltage regulator 120 that powers the microprocessor 110.

In the BackUp Mode, the battery voltage is very low. Therefore, the diode 140 begins to conduct current directly from the transformer output to bring the battery voltage quickly up to a residual voltage level. The charging current during the BackUp Mode is not controlled as previously described, but rather is limited only by the transformer impedance, the current sense resistor 150 and the non-linear resistor R7.

The charging current during the BackUp Mode must flow through the nonlinear resistor R7. Resistor R7 is a non-linear temperature sensitive current limiting resistor having a positive temperature coefficient, such as that sold under the tradename Polyswitch and manufactured by Raychem, Inc. As the current through resistor R7 increases and its temperature rises, its resistance increases. This in turn causes the current to decrease. By proper selection of the temperature characteristics of the resistor R7, it effectively becomes a passive current regulator. The accuracy of the charging current control of the resistor R7 is sufficient to control the charging current until the residual voltage in the battery 30 rises to a more acceptable level. The nonlinear characteristics of the resistor R7 also provide current limiting protection to the battery charger 100 in the event that the output of the battery charger 100 is shorted, or if a shorted or defective battery is connected to the battery charger 100. Furthermore, the non-linear temperature characteristics of the resistor R7 may be significantly enhanced by thermally coupling the resistor R7 to the diode 140.

The charging current during the BackUp Mode might typically be 1/20 to 1/4 of the normal charging current for the battery 30. This low charging current value is chosen to limit the power dissipation in resistor R7 to a reasonably low value. At this charge rate, the BackUp Mode of charging will typically last only a few minutes before sufficient residual charge is achieved to begin normal operation with the microprocessor 110.

The other components of the battery charger 100 shown in FIG. 2 are well known in the art. The resistor R8 is a thermistor within the battery 30 used, in conjunction with resistor R6, to provide a temperature signal to an analog-to-digital (A/D) converter input at the TEMP pin of the microprocessor 110. Resistor R6 is powered by a digital output from the microprocessor 110 when it is necessary to make a temperature measurement of the battery. This avoids a discharge path through resistor R6 for the battery current during a sleep mode. The battery voltage is measured by a resistor divider R4 and R5, which provides a signal to an A/D input at the AN3 pin of the microprocessor 110. The battery charging algorithm executed by the microprocessor uses the battery temperature and voltage information to establish the correct charging current profile, as is well known in the art.

Capacitors C1, C2, C3, C4 and C5 provide both EMI and static discharge immunity.

The battery charger 100 according to the present invention is intended to function with most battery back types and is capable of meeting most host device requirements. However, it is anticipated that in certain applications where a ripple voltage on the battery is undesirable, an optional electrochemical "super" capacitor C6 (FIG. 2) may be used to reduce voltage ripple while retaining the advantages of miniaturization and simplicity. Such a "super" capacitor would have large storage capacity, but nevertheless be relatively small in size so as not to compromise the small package of the battery charger 100 according to the present invention.

In summary, the present invention is directed to a battery charger comprising input terminals for connection to a wall transformer power supply to receive a supply of current; output terminals for connection to a battery to be charged; a switch coupled to the input terminals that controls flow of current from the transformer either to the output terminals for charging the battery or to ground; a resistor connected in series with the switch and the input terminals; a Schottky diode connected between the input terminals and output terminals so as to permit current flow to the input terminals when the voltage at the input terminals is greater than the voltage at the output terminals; a controller coupled to the switch to control whether the switch is open or closed, coupled to the resistor to monitor current flow through the resistor and coupled to the output terminals to monitor voltage in the battery, the controller determining when there is sufficient residual charge in the battery to initiate a charging mode comprising oscillation between first and second intervals, during the first interval the controller closing the switch and creating a short-circuit current path through the switch whereby current flows through the switch and increases at a rate dependent on a secondary leakage inductance of the transformer until the current through the resistor reaches a first threshold, and during the second interval the controller opening the switch so that current from the transformer flows through the Schottky diode into the battery and through the resistor and decreases at rate dependent on the secondary leakage inductance of the transformer until it reaches a second threshold which is less than the first threshold.

In addition, the present invention is directed to A method for charging a battery with current from a wall transformer power supply, comprising steps of: (a) coupling a switch to receive current from a wall transformer power supply; (b) closing the switch so that current from the wall transformer power supply is short-circuited through the switch and permitted to increase at a rate dependent on a secondary leakage inductance of the wall transformer; (c) monitoring the current through the switch and determining when it reaches a first threshold; (d) opening the switch when the current through it reaches the first threshold, thereby coupling current from the wall transformer power supply to the battery and allowing the current to decrease at a rate dependent on the secondary leakage inductance of the wall transformer; (e) monitoring the current through the switch and determining when it reaches a second threshold; (f) repeating steps (b)–(e).

The foregoing description is intended by way of example only and is not intended to limit the present invention in any way except as set forth in the following claims.

What is claimed is:

1. A battery charger comprising:

input terminals for a connection to a wall transformer power supply to receive a supply of current;

output terminals for connection to a battery to be charged;

a switch coupled to the input terminals that controls flow of current from the transformer either to the output terminals for charging the battery or to ground;

a resistor connected in series with the switch and the input terminals;

a diode connected between the input terminals and output terminals so as to permit current flow to the input terminals when the voltage at the input terminals is greater than the voltage at the output terminals;

a controller coupled to the switch to control whether the switch is open or closed, coupled to the resistor to monitor current flow through the resistor and coupled to the output terminals to monitor voltage in the battery, the controller determining when there is sufficient residual charge in the battery to initiate a charging mode comprising oscillation between first and second intervals, during the first interval the controller closing the switch and creating a short-circuit current path through the switch wherein current flows through the switch and increases at a rate dependent on a secondary leakage inductance of the transformer until the current through the resistor reaches a first threshold, and during the second interval the controller opening the switch so that the current from the transformer flows through the diode into the battery and through the resistor and decreases at rate dependent on the secondary leakage inductance of the transformer until it reaches a second threshold which is less than the first threshold.

2. The battery charger of claim 1, wherein the controller sets the first threshold to be approximately four times a desired average charging current for the battery and sets the second threshold to be approximately three times the desired average charging current for the battery.

3. The battery charger of claim 1, wherein the controller continuously and periodically determines an average charging current delivered to the battery by measuring voltage across the resistor.

4. The battery charger of claim 3, wherein the controller adjusts the first and second threshold to control the average charging current to a desired value.

5. The battery charger of claim 1, wherein the controller determines whether voltage is available at the input terminals, and when it is determined that insufficient voltage is available at the input terminals, the controller turns and maintains the switch off and enters a low power standby mode.

6. The battery charger of claim 1, wherein when voltage at the output terminals representative of the charge on the battery is less than a predetermined value, the battery charger enters a backup mode of operation wherein the diode is biased to conduct current from the transformer to the output terminals in order to charge the battery until the controller determines that the charge on the battery is greater than a predetermined value.

7. The battery charger of claim 6, and further comprising a non-linear temperature sensitive current limiting resistor connected between the input terminals and the diode, wherein the non-linear temperature sensitive current limiting resistor regulates current flow to the battery during the backup mode of charging.

8. The battery charger of claim 1, and further comprising a super capacitor connected in parallel with the output terminals to reduce voltage ripple.

9. A method for charging a battery with current from a wall transformer power supply, comprising steps of:

(a) coupling a switch to receive current from a wall transformer power supply;

(b) closing the switch so that current from the wall transformer power supply is short-circuited through the switch and permitted to increase at a rate dependent on a secondary leakage inductance of the wall transformer;

(c) monitoring the current through the switch and determining when it reaches a first threshold;

(d) opening the switch when the current through it reaches the first threshold, thereby coupling current from the wall transformer power supply to the battery and allowing the current to decrease at a rate dependent on the secondary leakage inductance of the wall transformer;

(e) monitoring the current through the switch and determining when it reaches a second threshold; and (f) repeating steps (b)–(e).

10. The method of claim 9, wherein the first threshold is approximately four times a desired average charging current for the battery and the second threshold is approximately three times the desired average charging current for the battery.

11. The method of claim 9, and further comprising the step of adjusting the first and second thresholds so as to control the average charging current delivered to the battery.

12. A battery charger comprising:

input terminals for connection to a wall transformer power supply to receive a supply of current;

output terminals for connection to a battery to be charged;

a switch coupled to the input terminals that controls flow of current from the transformer either to the output terminals f or charging the battery or to ground;

a current sensing resistor connected in series with the switch and the input terminals;

a diode connected between the input terminals and output terminals so as to permit current flow to the input terminals when the voltage at the input terminals is greater than the voltage at the output terminals;

a microprocessor coupled to the switch to control whether the switch is open or closed, coupled to the current sensing resistor to monitor current flow therethrough and coupled to the output terminals to monitor voltage in the battery, the microprocessor being programmed to initiate a charging mode comprising oscillation between a conduction interval and a flyback interval when the microprocessor determines there is sufficient residual charge in the battery, wherein during the conduction interval the microprocessor closes the switch and creates a short-circuit current path through the switch wherein current flows through the switch and increases at a rate dependent on a secondary leakage inductance of the transformer until the microprocessor determines that current through the current sensing resistor reaches the upper threshold, and during the flyback interval the microprocessor opens the switch so that current from the transformer flows through the diode into the battery and through the current sensing resistor and decreases at a rate dependent on the secondary leakage inductance of the transformer until it reaches the lower threshold which is less than the upper threshold; and a voltage regulator coupled to output terminals and to the microprocessor to control power to the microprocessor.

13. The battery charger of claim 12, wherein the microprocessor is programmed to set the upper threshold to be approximately four times a desired average charging current for the battery and sets the lower threshold to be approximately three times the desired average charging current for the battery.

14. The battery charger of claim 12, wherein the microprocessor is programmed to continuously and periodically determine an average charging current delivered to the battery by measuring current through the current sensing resistor.

15. The battery charger of claim 14, wherein the microprocessor is programmed to adjust the upper and lower thresholds based on the average charging current to control the average charging current to a desired value.

16. The battery charger of claim 12, wherein the microprocessor is programmed to determine when there is insufficient voltage available at the input terminals to turn and maintain the switch off and enter a lower power standby mode.

17. The battery charger of claim 12, wherein when voltage at the output terminals representative of the charge on the battery is less than a predetermined value, the battery charger enters a backup mode of operation wherein the diode is biased to conduct current from the transformer to the output terminals in order to charge the battery until the microprocessor determines that the charge on the battery is greater than a predetermined value.

18. The battery charger of claim 17, and further comprising a non-linear temperature sensitive current limiting resistor connected between the input terminals and the diode, wherein the non-linear temperature sensitive current limiting resistor regulates current flow to the battery during the backup mode.

19. The battery charger of claim 12, and further comprising a super capacitor connected in parallel with the output terminals to reduce voltage ripple.

* * * * *